US009489136B2

(12) United States Patent
Vijayrao et al.

(10) Patent No.: US 9,489,136 B2
(45) Date of Patent: Nov. 8, 2016

(54) INTERRUPT DRIVEN MEMORY SIGNALING

(71) Applicant: Facebook, Inc., Menlo Park, CA (US)

(72) Inventors: Narsing Vijayrao, Santa Clara, CA (US); Jason Taylor, Berkeley, CA (US)

(73) Assignee: Facebook, Inc., Menlo Park, CA (US)

( * ) Notice: Subject to any disclaimer, the term of this patent is extended or adjusted under 35 U.S.C. 154(b) by 139 days.

(21) Appl. No.: 14/614,145

(22) Filed: Feb. 4, 2015

(65) Prior Publication Data

US 2016/0117098 A1 Apr. 28, 2016

Related U.S. Application Data

(60) Provisional application No. 62/069,110, filed on Oct. 27, 2014.

(51) Int. Cl.
G06F 3/06 (2006.01)

(52) U.S. Cl.
CPC .............. G06F 3/061 (2013.01); G06F 3/0659 (2013.01); G06F 3/0673 (2013.01)

(58) Field of Classification Search
CPC ..... G06F 3/061; G06F 3/0659; G06F 3/0673
USPC ...... 711/154, 5, 105, 156, 158; 710/48, 260; 712/40; 714/34, 38.13
See application file for complete search history.

(56) References Cited

U.S. PATENT DOCUMENTS

| 6,295,566 | B1 | 9/2001 | Stufflebeam et al. | |
|---|---|---|---|---|
| 7,111,099 | B2 * | 9/2006 | Alexander | G06F 13/4243 710/300 |
| 8,032,688 | B2 * | 10/2011 | MacWilliams | G06F 13/1684 365/189.011 |
| 2002/0069301 | A1 * | 6/2002 | Fan | G06F 13/4022 709/253 |
| 2006/0236009 | A1 | 10/2006 | Tabira et al. | |
| 2007/0002668 | A1 * | 1/2007 | Williams | G06F 13/1684 365/230.06 |
| 2007/0013704 | A1 * | 1/2007 | MacWilliams | G06F 13/1684 345/542 |
| 2007/0156991 | A1 * | 7/2007 | Gould | G06F 11/1008 711/167 |
| 2008/0016313 | A1 | 1/2008 | Murotake et al. | |
| 2008/0082750 | A1 * | 4/2008 | Okin | G11C 5/04 711/115 |

(Continued)

OTHER PUBLICATIONS

U.S. Appl. No. 14/035,833, of Vijayrao, N. et al. filed Sep. 24, 2013.

(Continued)

*Primary Examiner* — Stephen Elmore
(74) *Attorney, Agent, or Firm* — Perkins Coie LLP

(57) ABSTRACT

Some embodiments includes an interrupt-driven data transport architecture utilizing a memory channel bus. For example, a first logic component at a first computing device can initiate a data access request involving a second logic component at a second computing device. The first logic component can store request information associated with the data access request in a predefined memory space of a memory module connected via a memory channel bus to the first logic component and the second logic component. The first logic component can then generate a request-ready interrupt signal through one or more redundant pins of the memory channel bus. The second logic component can be triggered by the interrupt signal to read the request information from the predefined memory space. The second logic component can use that information to complete the request.

20 Claims, 7 Drawing Sheets

(56) References Cited

U.S. PATENT DOCUMENTS

| | | | |
|---|---|---|---|
| 2008/0082751 A1* | 4/2008 | Okin | G06F 13/1668 711/115 |
| 2008/0082766 A1* | 4/2008 | Okin | G06F 13/1684 711/154 |
| 2011/0320698 A1 | 12/2011 | Wang et al. | |
| 2012/0079181 A1* | 3/2012 | Okin | G06F 13/1668 711/105 |
| 2014/0075106 A1* | 3/2014 | Okin | G11C 5/04 711/105 |
| 2014/0129751 A1 | 5/2014 | Cho et al. | |
| 2015/0089100 A1 | 3/2015 | Vijayrao et al. | |

OTHER PUBLICATIONS

Non-Final Office Action Mailed May 31, 2016 of U.S. Appl. No. 14/035,833 by Vijayrao, N., et al., filed Sep. 24, 2013.

* cited by examiner

US 9,489,136 B2

INTERRUPT DRIVEN MEMORY SIGNALING

CROSS-REFERENCE TO RELATED APPLICATION(S)

This application claims the benefit of U.S. Provisional Patent Application No. 62/069,110, entitled "INTERRUPT DRIVEN MEMORY SIGNALING," which was filed on Oct. 27, 2014, which is incorporated by reference herein in its entirety.

BACKGROUND

Clusters of computing devices including interconnected computing devices are sometimes employed to process high-volumes of data. A computing cluster is a set of computing devices (also, "nodes"), e.g., configured as server racks comprising computing device "sleds" occupying one or more enclosures, or a computing network comprising multiple computing devices. Various data communications technologies have been deployed to enable the sleds to exchange data, e.g., Ethernet, Fiberchannel, etc. However, these technologies generally exchange data more slowly than processors are able to process data. Increasing parallel processing and networking throughput can be useful to improve cluster performance. Different techniques to reduce interconnection overhead and latency have been tried using software and hardware, but such techniques are limited by conventional data pathway architectures.

One method of transporting data involves the use of a Peripheral Component Interconnect Express (PCIe) bus. The PCIe bus enables an external signal to interrupt the central processing unit (CPU) when data transport processes are ready to be performed with the source of the external signal. However, maintaining the PCIe bus requires additional hardware components (e.g., bus line drivers). This increases the overall cost of maintaining a computing cluster. Further, the PCIe bus also requires the CPU to quickly offload data from a PCIe buffer to a memory module or vice versa for most data transport operations.

Another technique for transferring data is via a network interface controller (NIC). Under a NIC data transport architecture, a computing device can prepare data for transmission, sharing, or copying to an external device (e.g., a different computing device) under command of an application or operating system, and then transfer the data via a network driver. For example, the application can prepare an outgoing data set in a first memory space (e.g., associated with a computing device on which the application executes) and then transfer the outgoing data set into a second memory space (e.g., of associated with a network driver or NIC). In response, the network driver may place the outgoing data set into a network input/output (TO) buffer. The network IO buffer may reside in a dedicated memory space of a network card. Once the outgoing data is in the network IO buffer, the network card can transmit the outgoing data through a network connection configured for use with the NIC, e.g., an optical fiber or an Ethernet cable. Under this architecture, the same outgoing data set is copied multiple times (e.g., at various buffers and memory spaces). This repeated copying can bottleneck the entire data transfer process and cause various inefficiencies. Accordingly, these inefficiencies can slow down the data transfer speeds of most cluster computing applications.

Figure 1:
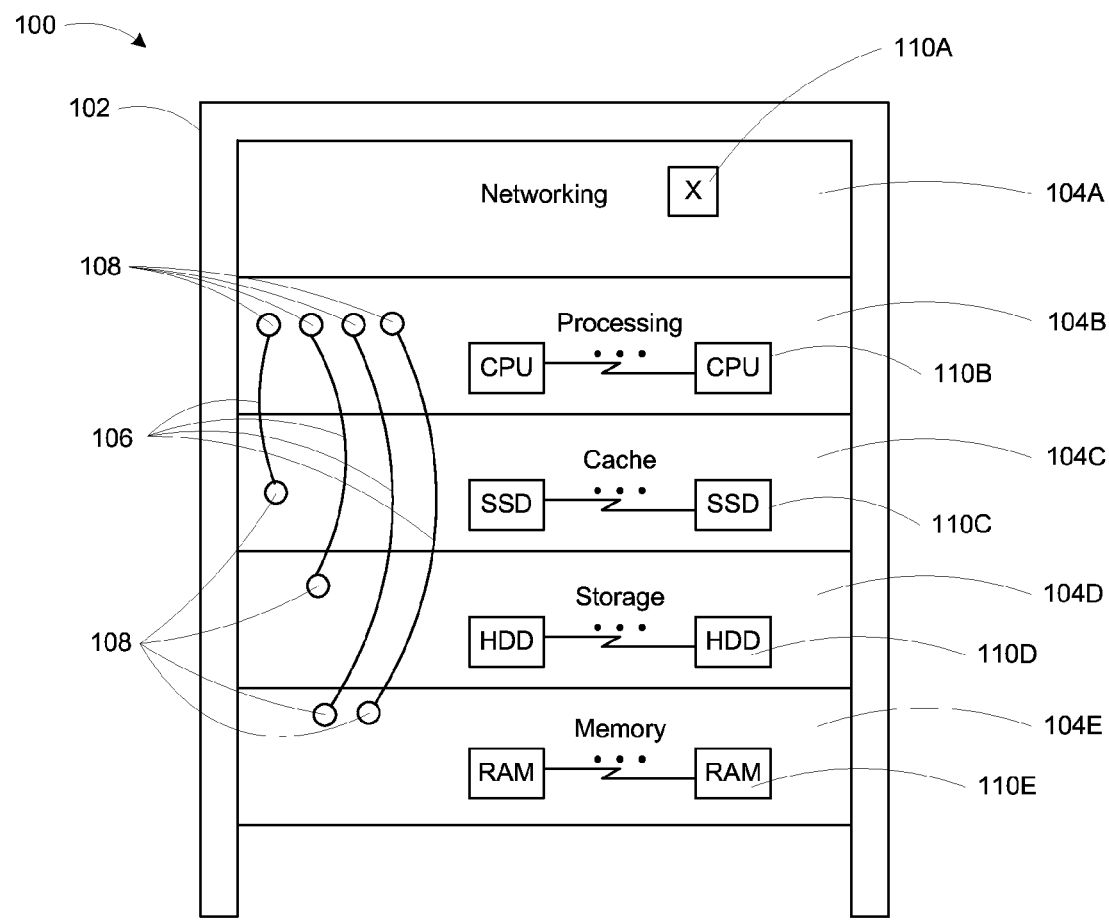
FIG. 1 is a block diagram illustrating an example of a cluster computing environment employing a memory channel for inter-device data transport, consistent with various embodiments.

The figures depict various embodiments for purposes of illustration only. One skilled in the art will readily recognize from the following discussion that alternative embodiments may be employed.

DETAILED DESCRIPTION

Embodiments are described for enabling computing devices to exchange data using a memory channel. A memory channel is typically used for exchanging data between a central processing unit ("processor") of a computing device and physical memory (e.g., random access memory) of the same computing device. However, the inventors have discovered that a memory channel can also be used as a data transport path for exchanging data between a first computing device and other computing devices (e.g., an application server or a data server) and/or a data storage device (e.g., a flash storage sled) that are not part of the first computing device. The data transport path may be implemented by a memory-channel data bus. In some embodiments, the memory-channel data bus may be modified from a conventional memory bus. In other embodiments, the memory-channel data buses may be manufactured, built, and/or configured independently of a conventional memory channel bus. In various embodiments, the memory-channel data buses may be compatible with a system architecture using one or more conventional memory modules.

A computing device (also referred to herein as a "data processing machine") may include a central processing unit (CPU). The CPU may be coupled to a memory module via the memory-channel data bus. The memory-channel data bus can connect the CPU with a data storage device or another data processing machine. For example, the memory-channel data bus may be based on a non-volatile dual in-line memory module (NVDIMM) channel. A typical NVDIMM channel can have a number of redundant pins to support power failure recovery (e.g., additional power or power-related signaling). For example, a double data rate fourth generation (DDR4) memory channel industry standard specifies use of the redundant pins to provide refresh power to the NVDIMM memory devices. The NVDIMM channel can be modified to connect one or more of the redundant pins to one or more general purpose input/output (GPIO) pins of the CPU (e.g., the CPU of the same computing device) via one or more pin interconnects.

For example, when requesting to retrieve data, the CPU can write the request information to a predefined partition of the memory module and generate a read request signal at the pin interconnects (e.g., at least a subset of the pin interconnects). In some embodiments, the CPU can generate the read request signal after or in response to the request information being fully written to the predefined partition. In response to detecting the read request signal, another logic component (e.g., a storage controller in the data storage device) can retrieve the request information from the predefined partition and begin transferring the requested data into a payload destination. In some embodiments, a memory space for the payload destination is dynamically allocated by the CPU. The payload destination address may be indicated in the request information. In some embodiments, the payload destination is a predefined memory partition as well. When the requested data is completely uploaded, the storage controller generates a request fulfillment signal at the pin interconnects to indicate completion of the data transfer. The request fulfillment signal at the GPIO pins can be interpreted as an interrupt signal (e.g., emulating a Peripheral Component Interconnect Express (PCIe) interrupt) at a kernel implemented by the CPU. In response to receiving the interrupt signal, the kernel can instruct the CPU to access the requested data stored in the payload destination. In some embodiments, in response to the interrupt signal, the kernel can instruct the CPU to access another predefined partition in the memory module to retrieve request feedback information. For example, the request feedback information can indicate any error involving the read request.

In another example, the data processing machine can similarly process a write request by utilizing a predefined partition of the memory module to store the write request information. The data processing machine can dynamically allocate a payload destination in the memory module and indicate the payload destination address in the write request information. For example, when requesting to write data, the CPU can write the write request information in the predefined partition of memory and generate a request ready interrupt signal at the pin interconnects. In some embodiments, the request ready signal is generated after the write request information is fully written to the predefined partition. In some embodiments, the request ready signal is generated after the write request information is fully written to the predefined partition and the payload data is written to the payload destination. In response to detecting the write request signal, a storage controller in the data storage device can retrieve the write request information from the predefined partition. The storage controller can allocate a memory space in at least one of its data storages for an incoming payload. Based on the write request information, the storage controller can retrieve the data payload from the payload destination to be written into the allocated memory space in its data storages. In some embodiments, an additional interrupt signal can be used to indicate that payload data is ready (e.g., fully written to the memory module), independent of when the write request information is ready (e.g., fully written to the memory module).

In these examples, the data processing machine is communicating with a storage controller for a data storage device (e.g., a flash sled). However, in several embodiments, the same processes and mechanisms can be utilized between data processing machines or between data storage devices (e.g., when backing up data or replicating data). For example, instead of a CPU and a storage controller pulsing or maintaining the interrupt signals at the one or more pin interconnects, the processes can involve two CPUs pulsing or maintaining the interrupt signals to communicate with one another.

In several embodiments, the read and write processes are limited by the amount information that can be passed via the redundant pins of the NVDIMM channel. The redundant pins can facilitate digital communication between logical units (e.g., CPUs, storage controllers, or other controller for a computing device). A redundant pin can be set to a high or a low state, corresponding to a 0 or a 1 in digital communication. In embodiments where there is a limited number of redundant pins, the read request process processing and the write request processing can utilize a two-path memory read operation. For example, a first path is triggered by the request information being ready in the memory module and a second path is triggered by the request fulfillment (e.g., payload data or data destination address) being ready in the memory module. In some embodiments, additional interrupt signaling paths can be added.

In some embodiments, where there are a sufficient number of redundant pins or where each pin can represent multiple bits of information, the request related information can be provided via the redundant pins instead of being written to a predefined partition of the memory module. In these embodiments, there is no need for storing the request information in the memory module first. In these embodiments, the interrupt signal can carry the request information.

In some embodiments, a device coupled to the redundant pins can maintain an interrupt signal until the interrupt signal is changed by another device connected to the redundant pins. In some embodiments, a device coupled to the redundant pins can pulse the interrupt signal (e.g., pulse for a preset time duration).

FIG. 1 is a block diagram illustrating an example of a cluster computing environment 100 employing a memory channel for inter-device data transport, consistent with various embodiments. The cluster computing environment 100 can provide high bandwidth data sharing and processing. For example, the cluster computing environment 100 can be a computing cluster, a server rack, or a server tray servicing a web application. As illustrated for example, the cluster computing environment 100 can include a disaggregated rack 102. The disaggregated rack 102 can be a computer cluster in which functional elements of the computer cluster are separated into separate devices, e.g., a networking (e.g., input/output (IO) processing) device 104A, a processing device 104B, a cache device 104C, a storage device 104D, and a memory service device 104E (collectively referred to as the "computing devices 104"). The computing devices 104 may be a computer, e.g., computer server, server sled, computer tray, desktop computer, or other types of computers. Each of the computing devices 104 may include at least a logic component (e.g., a controller or processor), a circuit board (e.g., a motherboard or a printed circuit board), and a memory module (e.g., a random access memory (RAM) module).

In various embodiments, memory-centric inter-device interconnects 106 coupled to memory channel ports 108 may be a medium for inter-device data transportation. The memory channel ports 108 enable the computing devices 104 to exchange data via the memory-centric inter-device interconnects 106. An inter-device interconnect can be implemented as one or more buses or cables. The memory-centric inter-device interconnects 106 can be have multiple pins (e.g., lines), similar to convention memory buses. The memory-centric inter-device interconnects 106 can transmit or receive a digital bit in each of the pins.

In some embodiments, each of the computing devices 104 may also include a network card, e.g., an optical or Ethernet NIC (not illustrated). The network card may be connected via a peripheral component interconnect (PCI) bus on the computing device's motherboard. Conventional inter-device architectures may utilize the network card as a portal for inter-device communication, where a cluster switch or router acts as a nexus for inter-device communications. As an example, a computing device may employ the network card to communicate with conventional computing devices not having a memory-centric inter-device interconnect or a memory channel port.

In some embodiments, disaggregation enables flexible allocation and/or re-allocation of system resources in the cluster computing environment 100 through customization of rack resources, and thus improving cluster scalability. For example, the networking device 104A may include one or more network components 110A (e.g., a switch or a network buffer); the processing device 104B may include one or more processor components 110B, the cache device 104C may include one or more cache memories 110C (e.g., solid state drives); the storage device 104D may include one or more persistent storage devices 110D (e.g., hard disks); and the memory service device 104E may include one or more random access memory modules 110E. The network components 110A, the processor components 110B, the cache memories 110C, the persistent storage devices 110D, and the random access memory modules 110E may be collectively referred to as "the resource components 110". Because the resource components 110 may serve the same client application, a same data set may necessarily be exchanged amongst multiple computing devices 104. Each of the resource components 110 can be independently serviced and/or upgraded, e.g., to suit the needs of applications the computing devices 104 may be configured to execute. As examples, a database application may receive faster storage devices (e.g., the persistent storage devices 110D), a graphics processing application may receive processor components 110B designed to speed up graphics applications, and a web application may receive larger cache memories (e.g., the cache memories 110C).

In the context of a cluster computing environment 100, especially one including the disaggregated rack 102, a data path architecture should reduce network bottlenecks to enable parallel functions and services to operate seamlessly. A data path architecture including the memory-centric inter-device interconnects 106 and the memory channel ports 108 is advantageous for high-bandwidth data transportation because of removal of bottlenecks including, e.g., networking buffers, PCI cards, or other networking hardware (e.g., Ethernet cables).

By utilizing the memory channel ports 108, processors in each of the computing devices 104 may utilize the existing memory module channels ("memory channel") as a medium of data communication that provides significant additional bandwidth as compared to conventional intra-subsystem data communications channels. For example, a 16 lane PCI data path may have around 40 Gbits/sec of bandwidth, whereas current dual in-line memory module (DIMM) technology may have approximately 10 GBytes/sec (i.e., approximately 80 Gbits/sec) of bandwidth from each memory module. Although computing device bus speeds have increased over time and continue to do so, so have memory module speeds. To further increase the bandwidth through the memory channel, the memory channel ports 108 may be multiplexed from multiple memory channels. For example, whereas each memory module currently has 10 GBytes/sec of bandwidth, a multiplex of four memory channels may have approximately 40 GBytes/sec of bandwidth.

The memory channel data path architecture can be used by any of the computing devices 104. As an example, the memory service device 104E may provide the random access memory modules 110E as a disaggregated pool of random access memory on a computing device separate from the processing device 104B. A memory controller on the memory service device 104E can expand and contract memory space for the processing device 104B, e.g., according to need on a dynamic or periodic basis. The memory-centric inter-device interconnects 106 can enable low-latency and high bandwidth communication between the memory service device 104E and the processing device 104B. As another example, regardless of whether there is disaggregation of cluster computing device functionalities, computing devices in the cluster computing environment 100 may utilize the memory channels to share data, e.g., large data sets, between processors (e.g., processors of the computing devices 104). Thus, the memory channel data path can enable much higher bandwidth and data communications speeds than conventional motherboard buses and/or interconnects.

Figure 2:
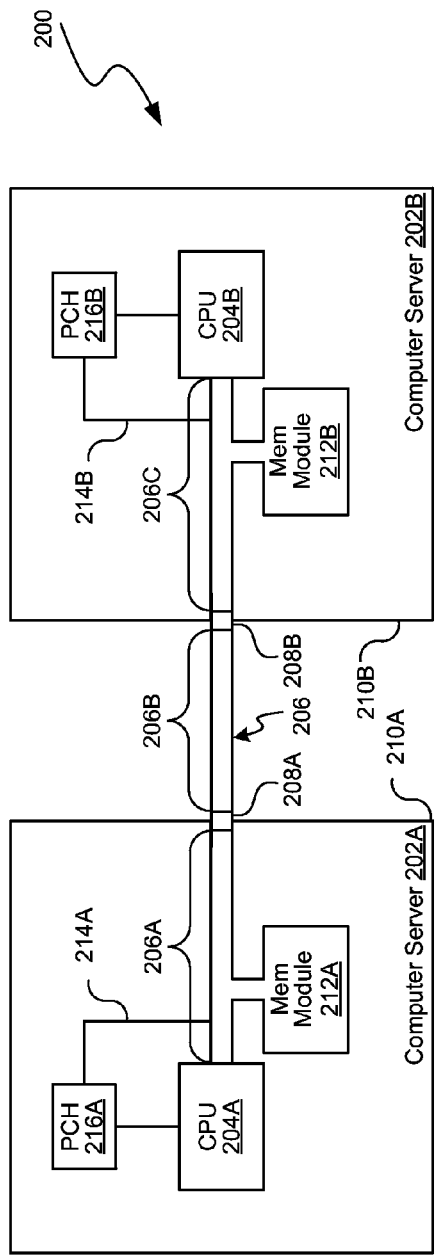
FIG. 2 is a block diagram illustrating a first example of a data transport architecture involving a computer cluster that implements an interrupt driven memory channel, in accordance with various embodiments.

FIG. 2 is a block diagram illustrating a system architecture of a first example of a computer cluster 200 implementing an interrupt driven memory channel, in accordance with various embodiments. The computer cluster 200 can include a computer server 202A and a computer server 202B. For example, the computer cluster 200 can be implemented as a computer rack, e.g., the disaggregated rack 102 of FIG. 1. The computer server 202A includes a central processing unit (CPU) 204A. Likewise, the computer server 202B includes a CPU 204B. The CPU 204A interfaces with and is coupled to a memory channel bus 206. The memory channel bus 206, for example, can be a random access memory (RAM). For example, the memory channel bus 206 can be a non-volatile dual in-line memory module (NVDIMM). In one particular example, the memory channel bus 206 can be a DDR4 RAM.

In some embodiments, the memory channel bus 206 may be segmented into several sections. An intra-device segment 206A may be within the computer server 202A. An inter-device segment 206B may be exposed outside of the computer server 202A and the computer server 202B. The inter-device segment 206B can be one of the memory-centric inter-device interconnects 106. The inter-device segment 206B may traverse through multiple computing devices in the computer cluster 200. Another intra-device segment 206C may be within the computer server 202B. In some embodiments, the memory channel bus 206 may include multiple branches such that two or more computing devices (e.g., computer servers or data storage devices) are connected thereto. A memory channel connector interface 208A (e.g., one of the memory channel ports 108) may be exposed on an external shell 210A of the computer server 202A such that the inter-device segment 206B may be connected to the intra-device segment 206A. Likewise, a memory channel connector interface 208B (e.g., one of the memory channel ports 108) may be exposed on an external shell 210B of the computer server 202B such that the inter-device segment 206B may be connected to the intra-device segment 206C.

The memory channel bus 206 enables computing devices connected thereto to share data via one or more memory modules (e.g., a memory module 212A, a memory module 212B, etc., collectively as the "memory modules 212"). The memory modules 212 are connected to the memory channel bus 206. For example, the memory module 212A is connected to the intra-device segment 206A and is positioned in the computer server 202A; and the memory module 212B is connected to the intra-device segment 206C and is positioned in the computer server 202B. In some embodiments, a CPU or other logic component of a computing device can access any memory module connected to the memory channel bus 206, regardless of which segment the CPU or the logic component is coupled to. For example, the CPU 204A can access the memory module 212A or the memory module 212B.

In some embodiments, a first logic component (e.g., the CPU 204A) in a first computing device (e.g., the computer server 202A) may initiate a data access request involving a second computing device (e.g., the computer server 202B). The data access request can involve a data transfer (e.g., a read request or a write request). In conventional memory architecture, a memory module coupled to a memory channel bus is a slave to one or more processors. Under such architecture, there is no interrupt mechanism that enables a memory module to inform a first processor when a second processor has written into the memory module intended for the first processor. In several embodiments, the memory channel bus 206 may be modified to extend a signaling interconnect 214A from one or more redundant pins of the memory channel bus 206 to feed into one or more general-purpose input output (GPIO) pins of the CPU 204A. Likewise, a signaling interconnect 214B from the redundant pins of the memory channel bus 206 can feed into one or more GPIO pins of the CPU 204B. Each of the signaling interconnects can have multiple pins (e.g., signal lines carrying a bit of digital information).

Memory channel buses have a large number of pins to transport data to and from the memory modules coupled thereto. In some implementations of memory channel buses, e.g., NVDIMM DDR4, there are pins that are not used to transport data to or from the memory modules. These are the redundant pins. Under these architectures, the redundant pins are for providing power and signaling in relation to power saving features (e.g., a set of pins for additional power supply and a set of pins for power-related signaling). In several embodiments, the redundant pins are re-configured and re-purposed for data transport request signaling. In many cases, a memory channel bus interface of a CPU does not implement an interrupt protocol. However, a CPU's interface with a peripheral component interconnect express (PCIe) or a platform controller hub (PCH) does implement an interrupt protocol. In several embodiments, at least a subset of the redundant pins are coupled to GPIO pins of the CPUs via the signaling interconnects (e.g., the signaling interconnect 214A or the signaling interconnect 214B). Inputs of GPIO pins can trigger a PCIe protocol that is capable of processing an interrupt signal at a kernel implemented by the CPUs (e.g., the CPU 204A or the CPU 204B). In some embodiments, at least a subset of the redundant pins are coupled to a PCH 216A of the CPU 204A via the signaling interconnect 214A and/or a PCH 216B of the CPU 204B via the signaling interconnect 214B. For example, the kernel of the CPU 204A and/or the CPU 204B can be modified to process the interrupt signal as described in FIGS. 5-6.

Figure 3:
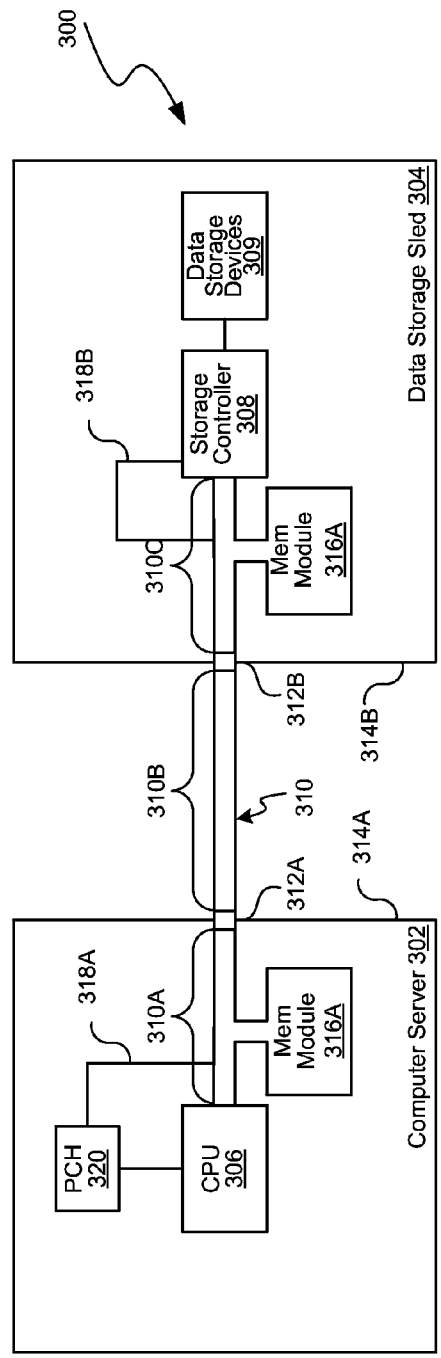
FIG. 3 is a block diagram illustrating a second example of a data transport system architecture involving a computer cluster implementing an interrupt driven memory channel, in accordance with various embodiments.

FIG. 3 is a block diagram illustrating a system architecture of a second example of a computer cluster 300 implementing an interrupt driven memory channel, in accordance with various embodiments. The computer cluster 300 can include a computer server 302 and a data storage sled 304. For example, the computer cluster 300 can be implemented as a computer rack, e.g., the disaggregated rack 102 of FIG. 1. The data storage sled 304, for example, can be a flash storage sled, the cache device 104C, the storage device 104D, or the memory service device 104E. The computer server 302 includes a central processing unit (CPU) 306. The data storage sled 304 includes a storage controller 308 that manages one or more data storage devices 309. The CPU 306 interfaces with and is coupled to a memory channel bus 310. The memory channel bus 310, for example, can be a random access memory (RAM). The memory channel bus 310, for example, can be the memory channel bus 206 of FIG. 2. As a specific example, the memory channel bus 310 can be a non-volatile dual in-line memory module (NVDIMM). The memory channel bus 310 can be a DDR4 RAM.

In some embodiments, the memory channel bus 310 may be segmented into several sections. An intra-device segment 310A may be within the computer server 302. An inter-device segment 310B may be exposed outside of the computer server 302 and the data storage sled 304. The inter-device segment 310B can be one of the memory-centric inter-device interconnects 106. The inter-device segment 310B can traverse through one or more computing devices in the computer cluster 300. Another intra-device segment 310C may be within the data storage sled 304. In some embodiments, the memory channel bus 310 may include multiple branches such that two or more computing devices (e.g., computer servers or data storage sleds) are connected thereto. A memory channel connector interface 312A (e.g., one of the memory channel ports 108) may be exposed on an external shell 314A of the computer server 302 such that the inter-device segment 310B may be connected to the intra-device segment 310A. Likewise, a memory channel connector interface 312B (e.g., one of the memory channel ports 108) may be exposed on an external shell 314B of the data storage sled 304 such that the inter-device segment 310B may be connected to the intra-device segment 310C.

The memory channel bus 310 enables computing devices connected thereto to share data via one or more memory modules (e.g., a memory module 316A, a memory module 316B, etc., collectively as the "memory modules 316"). The memory modules 316 are connected to the memory channel bus 206. For example, the memory module 316A is connected to the intra-device segment 310A and is positioned in the computer server 302; and the memory module 316B is connected to the intra-device segment 310C and is positioned in the data storage sled 304. In some embodiments, a CPU or other logic component of a computing device can access any memory module connected to the memory channel bus 310, regardless of which segment the CPU or the logic component is coupled to. For example, the CPU 306 can access the memory module 316A or the memory module 316B.

In some embodiments, a first logic component (e.g., the CPU 306) in a first computing device (e.g., the computer server 302) in the computer cluster 300 may initiate a data access request involving a second computing device in the computer cluster 300. The data access request can involve a data transfer (e.g., a read request or a write request). In conventional memory architecture, a memory module coupled to a memory channel bus is a slave to one or more processors. Under such architecture, there is no interrupt mechanism that enables a memory module to inform a first processor when a second processor has written into the memory module intended for the first processor. In several embodiments, the memory channel bus 310 may be modified to extend a signaling interconnect 318A from one or more redundant pins of the memory channel bus 310 to feed into one or more general-purpose input output (GPIO) pins of the CPU 306. A signaling interconnect 318B from the one or more redundant pins of the memory channel bus 310 can also feed into one or more GPIO pins of the storage controller 308. Each of the signaling interconnects can have multiple pins (e.g., signal lines carrying a bit of digital information).

In several embodiments, the redundant pins are re-configured and re-purposed for data transport signaling. In many cases, memory channel bus interface of a CPU does not implement an interrupt protocol. However, a CPU's interface with a peripheral component interconnect express (PCIe) or a platform controller hub (PCH) does implement an interrupt protocol. Hence, in several embodiments, at least a subset of the redundant pins are coupled to the one or more GPIO pins of the CPUs. Inputs to the GPIO pins can trigger a PCIe protocol that is capable of processing an interrupt signal at a kernel implemented by the logic components (e.g., the CPU 306). For example, the kernel of the CPU 306 can be modified to process the interrupt signal as described in FIGS. 5-6. In some embodiments, at least a subset of the redundant pins are coupled to a PCH 320 of the CPU 306. Similarly, inputs to GPIO pins of a storage controller (e.g., the storage controller 308) can trigger an interrupt signal processing protocol at the storage controller.

Figure 4:
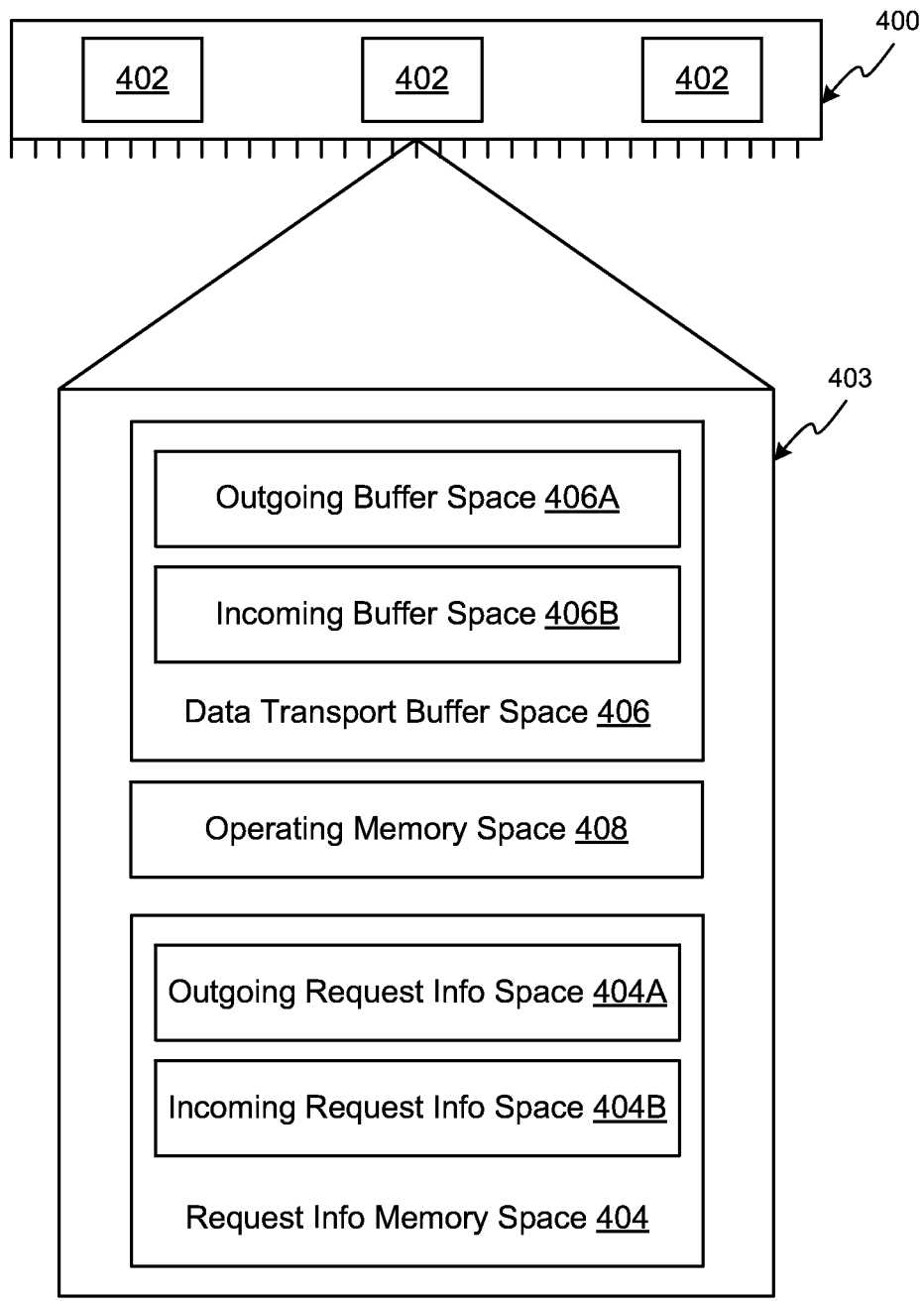
FIG. 4 is a block diagram illustrating an example of a memory module configured for an interrupt driven memory channel, in accordance with various embodiments

FIG. 4 is a block diagram illustrating an example of a memory module 400 configured for an interrupt driven memory channel, in accordance with various embodiments The memory module 400 is a device for storing digital data that is coupled to a memory channel bus. For example, the memory module 400 can include one or more memory components 402. The memory components 402, for example, may be one or more random access memory integrated circuits. The memory components 402 are adapted to store digital data for one or more processors.

Memory space 403 available in the memory module 400 may be referenced via a physical address space or a virtual address space. Such memory space 403 may be partitioned into at least a request information memory space 404, a data transport buffer space 406, and an operating memory space 408. The request information memory space 404 can further include an outgoing request information space 404A and an incoming request information space 404B. The outgoing request information space 404A and the incoming request information space 404B are predefined memory spaces known to logic components connected to the interrupt driven memory channel (e.g., implemented by the memory channel bus). The memory addresses of these predefined memory spaces can be programmed into kernels and/or operating systems implemented by the logic components.

The data transport buffer space 406 can further include an outgoing buffer space 406A and an incoming buffer space 406B. In some embodiments, the outgoing buffer space 406A and the incoming buffer space 406B may be dynamically allocated. When these buffer spaces are dynamically allocated, the memory addresses of the outgoing buffer space 406A and/or the incoming buffer space 406B can be stored as part of request information in the request information memory space 404. In some embodiments, the outgoing buffer space 406A and the incoming buffer space 406B can be predefined memory spaces similar to the request information memory space 404.

The operating memory space 408 is the free memory space that a master logic component can utilize. In a conventional system architecture, a memory module weight include only the operating memory space 408. For example, the operating memory space 408 may be randomly accessed by applications running on a CPU.

In some embodiments, the outgoing request information space 404A and the outgoing buffer space 406A can be subdivided into memory spaces for specific destination devices, e.g., a particular data processing machine or a particular data storage machine.

Figure 5:
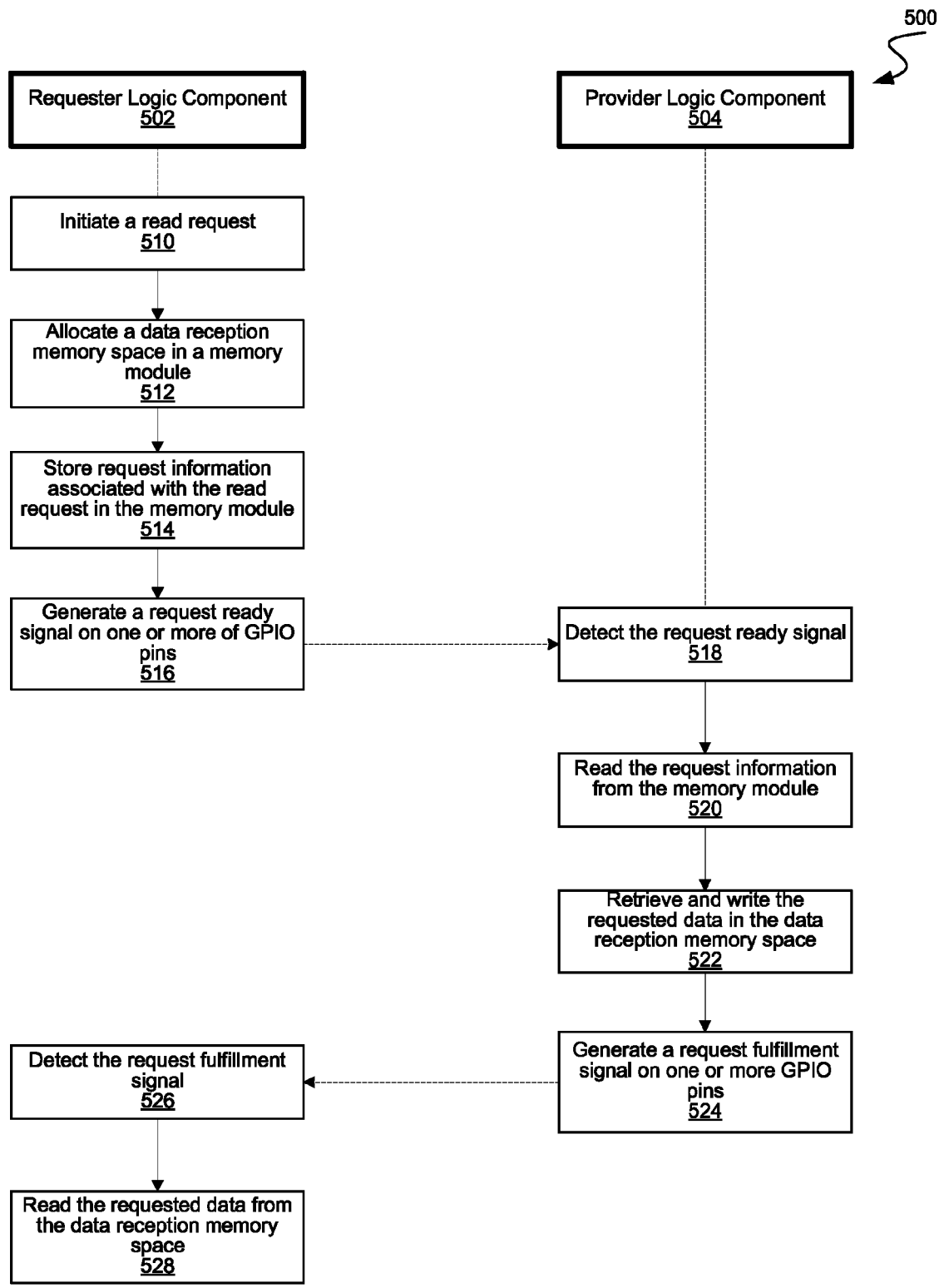
FIG. 5 is a flow diagram illustrating a method of executing a read request via an interrupt driven memory channel, in accordance with various embodiments.

FIG. 5 is a flow diagram illustrating a method 500 of executing a read request via an interrupt driven memory channel, in accordance with various embodiments. The method 500 may be performed by a requester logic component 502 (e.g., the CPU 204A or the CPU 306) and a provider logic component 504 (e.g., the CPU 204B or the storage controller 308). Both the requester logic component 502 and the provider logic component 504 are connected to a memory channel bus (e.g., the memory channel bus 206 or the memory channel bus 310).

At block 510, the requester logic component 502 can initiate a read request. In some embodiments, in response to the read request, at block 512, the requester logic component 502 can dynamically allocate a data reception memory space in a memory module (e.g., one of the memory modules 212 or one of the memory modules 316) on the memory channel bus based on the request information (e.g., requested data size if known or an estimation of the requested data size). In some embodiments, the data reception memory space is pre-allocated by a kernel associated with the requester logic component 502 (e.g., instead of dynamically being allocated). In some embodiments, the data reception memory space can be configured to store only incoming data.

In response to the read request, at block 514, the requester logic component 502 can store request information associated with the read request in a predefined memory space (e.g., a physical or virtual partition) in the memory module on the memory channel bus. In some embodiments, the predefined memory space is configured to store request information specifically for read requests. In some embodiments, the predefined memory space is configured to store specifically outgoing request information. In several embodiments, the predefined memory space is known to the kernel of the provider logic component 504.

At block 516, the requester logic component 502 can generate a request ready signal (e.g., an interrupt signal) via one or more of its GPIO pins. The signal is carried through one or more redundant pins of the memory channel bus to one or more GPIO pins of the provider logic component 504. The redundant pins are digital signal lines in the memory channel bus. The redundant pins are modified to connect at least two logic components coupled to the memory channel bus to enable interrupt signaling between the logic components. In several embodiments, the redundant pins are repurposed from pins that are adapted for power failure recovery of memory modules.

At block 518, the provider logic component 504 can detect the request ready signal at the one or more of its GPIO pins. In some embodiments, the detection step is an interrupt process. At block 520, in response to detecting the request ready signal, the provider logic component 504 can read the request information associated with the read request from the predefined memory space in the memory module. In some embodiments, blocks 518 and 520 can correspond with an interrupt protocol implemented by the provider logic component 504. That is, the detection step at block 518 can occur without a process thread that continually or periodically polls the GPIO pins. The provider logic component 504 can execute the process step at block 520 directly in response to detection of the request ready signal. The memory address of the predefined memory space is preconfigured in the provider logic component 504 or in a kernel implemented by the provider logic component 504.

At block 522, the provider logic component 504 can retrieve the requested data based on the request information and write the retrieved data as a data payload to the data reception memory space in the memory module. In some embodiments, the memory module of the data reception memory space is different from the memory module of the predefined memory space. In some embodiments, both the data reception memory space and the predefined memory space are in the same memory module. In some embodiments, the memory address of the data reception memory space is preconfigured in the provider logic component 504 or the kernel implemented by the provider logic component 504. In some embodiments, the memory address of the data reception memory space is provided in the request information retrieved at block 520.

At block 524, the provider logic component 504 can generate a request fulfillment signal on one or more of its GPIO pins when the provider logic component 504 fulfills the write request. For example, the provider logic component 504 is deemed to have fulfilled the write request when it finishes writing the requested data (e.g., as defined in the request information) in the data reception memory space. In some embodiments, the provider logic component 504 can write feedback information in another predefined memory space known to the kernel of the requester logic component 502.

At block 526, the requester logic component 502 can detect that the request fulfillment signal is present on its one or more GPIO pins. In response to detecting the request fulfillment signal, the requester logic component 502, at block 528, can read the requested data from the data reception memory space. In some embodiments, in response to detecting the request fulfillment signal, the requester logic component 502 can read the feedback information at the other predefined memory space. In some embodiments, blocks 526 and 528 can correspond with an interrupt protocol implemented by the requester logic component 502. That is, the detection step at block 526 can occur without a process thread that continually or periodically polls the GPIO pins. The requester logic component 502 can execute the process step at block 528 directly in response to detection of the request fulfillment signal.

Those skilled in the art will appreciate that the logic illustrated in FIG. 5 and described above, and in each of the flow diagrams discussed below, may be altered in a variety of ways. For example, the order of the logic may be rearranged, substeps may be performed in parallel, illustrated logic may be omitted, other logic may be included, etc.

Figure 6:
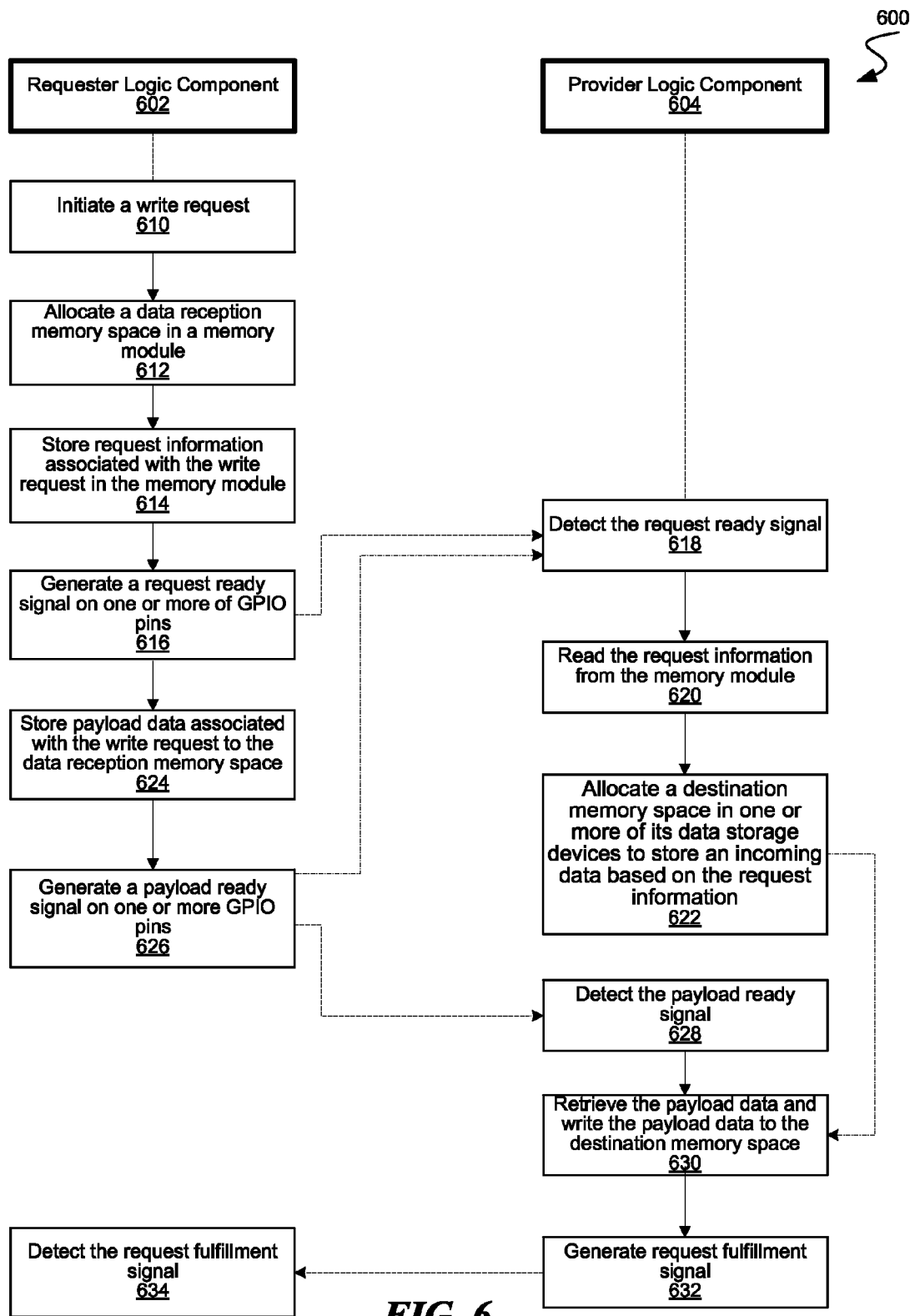
FIG. 6 is a flow diagram illustrating a method of executing a write request via an interrupt driven memory channel, in accordance with various embodiments.

FIG. 6 is a flow diagram illustrating a method 600 of executing a write request via an interrupt driven memory channel, in accordance with various embodiments. The method 600 may be performed by a requester logic component 602 (e.g., the CPU 204A or the CPU 306) and a provider logic component 604 (e.g., the CPU 204B or the storage controller 308). Both the requester logic component 602 and the provider logic component 604 are connected to a memory channel bus (e.g., the memory channel bus 206 or the memory channel bus 310).

At block 610, the requester logic component 602 can initiate a write request. In some embodiments, in response to the write request, at block 612, the requester logic component 602 can dynamically allocate a data reception memory space in a memory module (e.g., one of the memory modules 212 or one of the memory modules 316) on the memory channel bus based on the request information (e.g., requested data size if known or an estimation of the requested data size). In some embodiments, the data reception memory space is pre-allocated by a kernel associated with the requester logic component 602 (e.g., instead of dynamically being allocated). In some embodiments, the data reception memory space can be configured to store only outgoing data.

In response to the write request, at block 614, the requester logic component 602 can store request information associated with the write request in a predefined memory space (e.g., a physical or virtual partition) in the memory module. In some embodiments, the predefined memory space is configured to store request information specifically for write requests. In some embodiments, the predefined memory space is configured to store specifically outgoing request information. In several embodiments, the predefined memory space is known to the kernel of the provider logic component 604.

At block 616, the requester logic component 602 can generate a request ready signal (e.g., an interrupt signal) via one or more of its GPIO pins. The signal is carried through one or more redundant pins of the memory channel bus to one or more GPIO pins of the provider logic component 604. The redundant pins are digital signal lines in the memory channel bus. The redundant pins are modified to connect at least two logic components coupled to the memory channel bus to enable interrupt signaling between the logic components. In several embodiments, the redundant pins are repurposed from pins that are adapted for power failure recovery of memory modules.

At block 618, the provider logic component 604 can detect the request ready signal at the one or more of its GPIO pins. In some embodiments, the detection step is an interrupt process. At block 620, in response to detecting the request ready signal, the provider logic component 604 can read the request information associated with the read request from the predefined memory space in the memory module. In some embodiments, blocks 618 and 620 can correspond with an interrupt protocol implemented by the provider logic component 604. That is, the detection step at block 618 can occur without a process thread that continually or periodically polls the GPIO pins. The provider logic component 604 can execute the process step at block 620 directly in response to detection of the request ready signal. The memory address of the predefined memory space is preconfigured in the provider logic component 604 or in a kernel implemented by the provider logic component 604. At block 622, the provider logic component 604 can allocate a destination memory space in one or more of its data storage devices to store incoming data based on the request information associated with the write request.

At block 624, in response to generating the request ready signal, the requester logic component 602 can store payload data associated with the write request to the data reception memory space in the memory module. The requester logic component 602 can store the payload data without waiting for a response back from the provider logic component 604. That is, block 624 can execute concurrently from blocks 618, 620, and 622.

In some embodiments, the memory module of the data reception memory space is different from the memory module of the predefined memory space. In some embodiments, both the data reception memory space and the predefined memory space are in the same memory module. In some embodiments, the memory address of the data reception memory space is preconfigured in the provider logic component 604 or the kernel implemented by the provider logic component 604. In some embodiments, the memory address of the data reception memory space is provided in the request information retrieved at block 620.

In some embodiments, at block 626, the requester logic component 602 can generate a payload ready signal at its GPIO pins. In other embodiments, the payload ready signal can be combined together with the request ready signal. In these embodiments, the requester logic component 602 sends the combined request ready signal when both the request information and the payload data are ready (e.g., written to their respective destinations).

In some embodiments, at block 628, the provider logic component 604 can detect the payload ready signal. At block 630, the provider logic component 604 can retrieve the payload data from the data reception memory space and store the payload data in the destination memory space of its data storage devices. In some embodiments, block 630 can be in response to block 628 as part of a processor or controller interrupt process. In other embodiments, where the request ready signal also indicates that the payload is ready, block 630 can be executed/performed after or in response to block 622.

In response to storing the payload data, at block 632, the provider logic component 604 can generate a request fulfillment signal on one or more of its GPIO pins. For example, the provider logic component 604 is deemed to have fulfilled the write request when it finishes storing the payload data (e.g., as defined in the request information) in the destination memory space. In some embodiments, block 632 can store request-related feedback information in another predefined memory space known to the kernel of the requester logic component. For example, the feedback information can include any error encountered when performing the write request, the memory address of the destination memory space, a security key associated with the destination memory space, or any combination thereof.

At block 634, the requester logic component 602 can detect that the request fulfillment signal is present on its one or more GPIO pins. In response to detecting the request fulfillment signal, the requester logic component 602, can read the feedback information from the other predefined memory space in the memory module to complete the write request.

While processes or methods are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Figure 7:
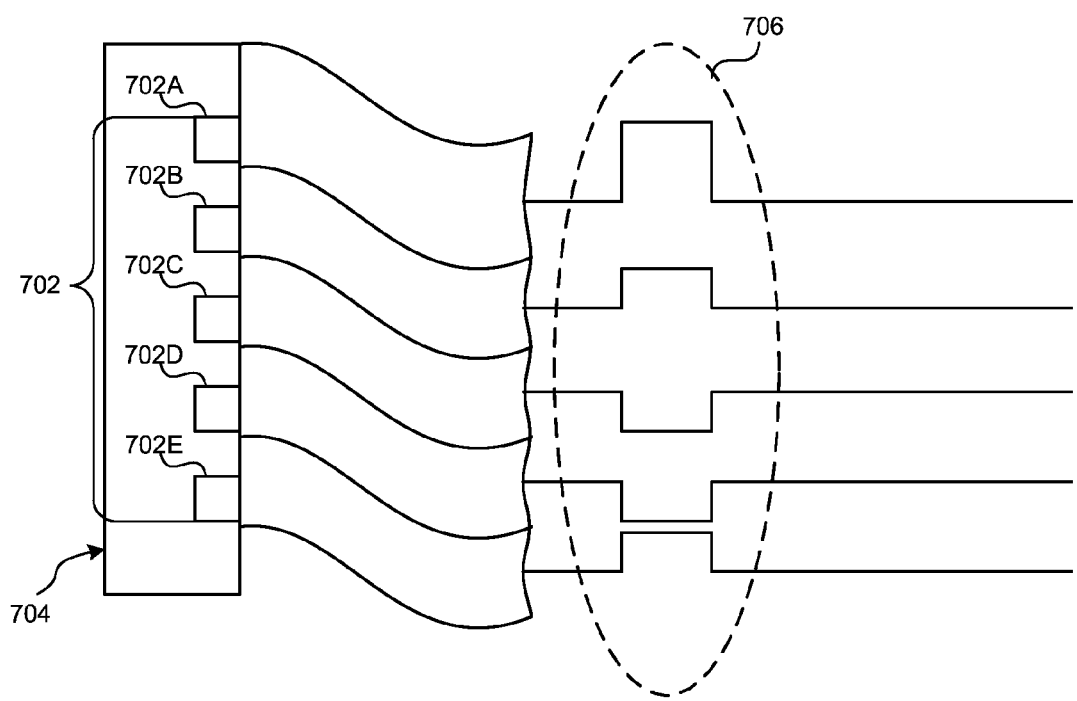
FIG. 7 is a block diagram illustrating a memory channel bus that indicates operational states of an interrupt driven memory channel, consistent with various embodiments.

FIG. 7 is a block diagram illustrating a memory channel bus that indicates operational states of an interrupt driven memory channel, consistent with various embodiments. The potential states of the interrupt driven memory channel can be represented by one or more redundant pins 702 of a memory channel bus 704. The redundant pins 702 can be connected to logic components (e.g., the CPU 204A, the CPU 204B, the CPU 306, or the storage controller 308) on at least two ends of the memory channel bus 704. The redundant pins 702 can be coupled to GPIO pins of the logic components. In some embodiments, a logic component at every end of the memory channel bus 704 can generate a state indication signal 706 via the redundant pins 702. In some cases, the state indication signal 706 can trigger an interrupt processing protocol implemented by a kernel at one of the logic components.

Figure 8:
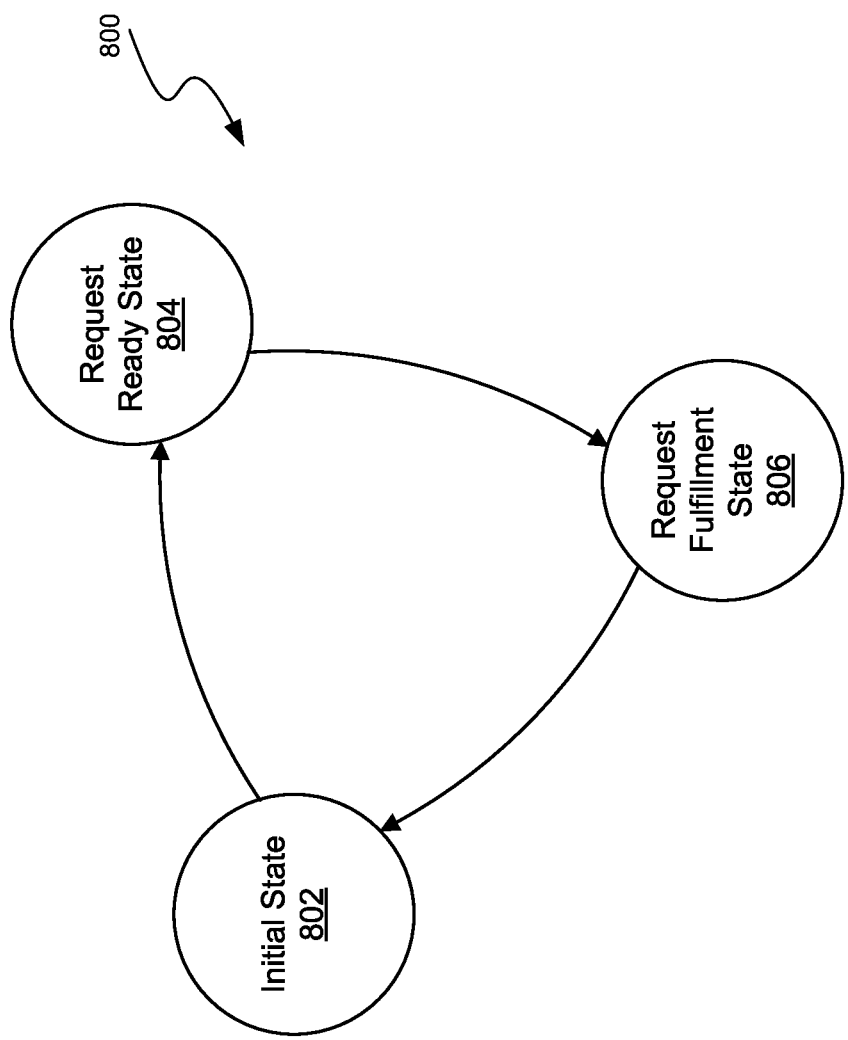
FIG. 8 is a state diagram illustrating an example of a state machine of a kernel implementing an interrupt driven memory channel, consistent with various embodiments.

The kernels and/or operating systems of the logic components can be configured to operate in accordance with a state diagram, e.g., the state diagram illustrated in FIG. 8. The state diagram can indicate conditional triggers that would cause a logic component to change the state represented by the state indication signal 706. The logic component can change the state by changing the state indication signal 706.

Various schemes may be implemented to represent the potential states of the interrupt driven memory channel. In the illustrated example, a set of pins (e.g., a first pin 702A, a second pin 702B, a third pin 702C, a fourth pin 702D), in sequence, can be a digital representation (e.g., 4 bits and therefore 16 states) of a state of a data access request. The bits can be represented by a high-voltage or a low voltage at each of the pins. A fifth pin 702E represents an on or an off tag on the represented state (e.g., respectively by a high or a low voltage). The states for a read request, for example, can include a "request initialization" state, a "request ready" state, a "request fulfillment" state, or any combination thereof. The states for a write request, for example, can include a "request initialization" state, a "request ready" state, a "payload ready" state, a "request fulfillment" state, or any combination thereof. In some embodiments, only a subset of these states are represented by the redundant pins 702. For example, only a subset of the states that necessitate a response from the other end of the memory channel bus 704 are represented by the redundant pins 702. In some embodiments, additional states and corresponding indication signals can be passed through the redundant pins 702. For example, indication signals that acknowledges the receipt of request information or retrieval of payload data may be added into the state machine.

In some embodiments, each of the redundant pins 702 can represent an on or off state of a particular channel (e.g., instead of a single pin indicating the on or off state). In some embodiments, different sets of the redundant pins 702 can represent multiple parallel channels for logic components on the memory channel bus 704 to communicate. The different sets can represent multiple state diagrams of parallel processes (e.g., a data read process and a data write process).

FIG. 8 is a state diagram illustrating an example of a state machine 800 of a kernel implementing an interrupt driven memory channel, consistent with various embodiments. The kernel can implement a state machine associated with data transport activities through the interrupt driven memory channel. At an initial state 802, the kernel expects no data transport activity through the interrupt driven memory channel. When the kernel receives a data transport request (e.g., a read request or a write request), the kernel can begin processing the data transfer request by writing request information into a predefined memory space in a memory module on the interrupt driven memory channel. When the request information is fully written, the state machine 800 can move to a request ready state 804. The kernel can send a first interrupt signal through the interrupt driven memory channel to indicate the request ready state 804. This interrupt signal enables an external logic component, which can operate its own kernel, to synchronize with the state machine 800 of the kernel. The external logic component can go to the predefined memory space to retrieve the request information in response to the first interrupt signal.

For a read request, the external logic component can identify the requested data based on the request information, retrieve the requested data from its data storage devices, and write the requested data to a data reception area as instructed by the request information. For a write request, the external logic component can identify metadata related to payload data to be written based on the request information, retrieve the payload data from a data reception area as instructed by the request information, and write the payload data to its data storage devices. The external logic component can send a second interrupt signal to notify the kernel that the request has been fulfilled. Upon receiving the second interrupt signal, the kernel can update the state machine 800 to move to a request fulfillment state 806. After acknowledging the request fulfillment, the kernel can return the state machine 800 to the initial state 802.

In several embodiments, one or more state machines can be maintained by the kernel. For example, there can be one state machine for each type of request. For another example, there can be one or more state machines for each destination (e.g., when more than two logic components are connected together via the interrupt-driven memory channel).

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media (e.g., non-transitory storage medium) that may store instructions that implement at least portions of the described technology. For example, the non-transitory storage medium can include volatile or non-volatile memory modules. In addition, the data structures and message structures may be stored or transmitted via a data transmission medium, such as a signal on the communications link. Various communications links may be used, such as the Internet, a local area network, a wide area network, or a point-to-point dial-up connection. Thus, the computer-readable media can comprise computer-readable storage media (e.g., "non-transitory" media) and computer-readable transmission media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the disclosed technology is not limited except as by the appended claims.

What is claimed is:

1. A method, comprising:
   identifying a data access request at a first logic component of a first computing device, wherein the data access request involves a second logic component;
   storing request information associated with the data access request in a first predefined memory space of a memory module connected via a memory channel bus to the first logic component and to the second logic component, wherein the first predefined memory space is known to the second logic component;
   generating, by the first logic component, a request-ready interrupt signal through one or more redundant pins of the memory channel bus, wherein the redundant pins are pins that are not specified by an industry standard memory channel specification to carry data to or from the memory module;
   receiving, by the first logic component, a request fulfillment interrupt signal on the one or more redundant pins of the memory channel bus; and
   completing, by the first logic component, the data access request in response to receiving the request fulfillment interrupt signal.

2. The method of claim 1, wherein the data access request is a read request; and further comprising:
   in response to the data access request, dynamically allocating a data reception memory space for storing requested data based on the request information; and
   storing an address of the data reception memory space as part of the request information in the first predefined memory space.

3. The method of claim 2, wherein completing the data access request includes retrieving the requested data from the data reception memory space in response to the request fulfillment interrupt signal.

4. The method of claim 1, wherein the data access request is a write request; and further comprising:
   in response to the data access request, storing payload data to a data reception memory space; and
   storing an address of the data reception memory space as part of the request information in the first predefined memory space.

5. The method of claim 4, wherein completing the data access request includes retrieving a memory address of where the payload data is stored by the second logic component from a second predefined memory space in the memory module; and wherein the second predefined memory space is known to both the first logic component and the second logic component.

6. A computing device, comprising:
   a logic component capable of processing data input according to logical instructions;
   a memory channel bus coupled to the logic component; and
   a memory module, coupled to the memory channel bus, configured to provide random-access memory space to the logic component via the memory channel bus; and
   wherein one or more redundant pins of the memory channel bus are communicatively coupled to one or more general purpose input output (GPIO) pins of the logic component.

7. The computing device of claim 6, wherein the memory channel bus is exposed for external connection outside of the computing device.

8. The computing device of claim 6, wherein at least a portion of the memory module is pre-defined as a request information area such that when the logic component is initiating a data access request, request-related information defining the data access request is written into the request information area; and wherein in response to writing the request-related information defining the data access request into the request information area, the logic component is configured to generate a request ready interrupt signal at the GPIO pins to cause an external device to fulfill the data access request.

9. The computing device of claim 6, wherein the memory channel bus includes a first set of data transfer pins other than the redundant pins, wherein the first set of data transfer pins are configured to move data to or from the random-access memory space of the memory module.

10. The computing device of claim 6, wherein at least a subset of the redundant pins are configured to communicate one or more operational states of a data transfer request involving the logic component.

11. A server rack, comprising:
a first computing device;
a memory channel bus coupled to the first computing device, wherein a first logic component of the first computing device interfaces with the memory channel bus, and wherein at least a redundant pin of the memory channel bus is coupled to a first general purpose input output (GPIO) pin of the first logical component;
a memory module coupled to the memory channel bus; and
a second computing device coupled to the memory channel bus, wherein the second computing device includes a second logic component that interfaces with the memory channel bus, and the redundant pin is coupled to the second computing device.

12. The server rack of claim 11, wherein the redundant pin is a part of the memory channel bus that is not adapted to transfer data to and from one or more memory modules coupled to the memory channel bus.

13. The server rack of claim 11, wherein non-redundant pins of the memory channel bus are coupled to the first logical component of the first computing device and a second logical component of the second computing device.

14. The server rack of claim 11, wherein the first computing device is a computer server and the second computing device is a data storage sled.

15. The server rack of claim 14, wherein the memory module is in the computer server.

16. The server rack of claim 14, wherein the memory module is in the data storage sled.

17. The server rack of claim 14, wherein the first logic component is a central processing unit (CPU) and the second logic component is a storage controller.

18. The server rack of claim 11, wherein the first computing device is a first computer server and the second computing device is a second computer server.

19. The server rack of claim 11, wherein the memory module is a non-volatile dual in-line memory module (NVDIMM).

20. The server rack of claim 11, wherein the redundant pin is part of a set of optional pins for power failure management that are reconfigured as an interrupt signaling channel.

* * * * *